United States Patent [19]
Gray

[11] Patent Number: 5,819,309
[45] Date of Patent: Oct. 6, 1998

[54] AUTOMATED TAPE CARTRIDGE LIBRARY WITH ACCELERATED CALIBRATION

[75] Inventor: Martin D. Gray, La Jolla, Calif.

[73] Assignee: Overland Data, Inc., San Diego, Calif.

[21] Appl. No.: 599,148

[22] Filed: Feb. 9, 1996

[51] Int. Cl.⁶ .............................. G06F 13/16; G11B 5/78
[52] U.S. Cl. .......................... 711/111; 360/134; 369/30; 369/178
[58] Field of Search ................... 395/438, 681, 395/427, 428; 360/78.02, 78.03, 83–85, 90–94, 134; 369/30, 178; 711/111, 101, 102

[56] References Cited

U.S. PATENT DOCUMENTS

| | | | |
|---|---|---|---|
| 4,772,964 | 9/1988 | Kaida | 360/67 |
| 5,121,260 | 6/1992 | Asakawa et al. | 360/31 |
| 5,210,829 | 5/1993 | Bitner | 395/877 |
| 5,287,459 | 2/1994 | Gniewek | 369/34 |
| 5,303,034 | 4/1994 | Carmichael et al. | 356/375 |
| 5,325,370 | 6/1994 | Cleveland et al. | 371/37.4 |
| 5,357,495 | 10/1994 | Solhjell | 369/34 |
| 5,384,668 | 1/1995 | Shih et al. | 360/39 |
| 5,403,140 | 4/1995 | Carmichael et al. | 414/280 |
| 5,487,171 | 1/1996 | Dodt et al. | 395/840 |
| 5,526,133 | 6/1996 | Paff | 386/117 |
| 5,602,684 | 2/1997 | Corbitt | 386/52 |

FOREIGN PATENT DOCUMENTS

| | | |
|---|---|---|
| 0114186 | 8/1984 | European Pat. Off. . |
| 0276967 | 3/1988 | European Pat. Off. . |
| 0578918 | 1/1994 | European Pat. Off. . |
| 0581601 | 2/1994 | European Pat. Off. . |
| 07141838 | 2/1995 | Japan . |
| 8605292 | 9/1986 | WIPO . |

*Primary Examiner*—Eddie P. Chan
*Assistant Examiner*—Reginald G. Bragdon
*Attorney, Agent, or Firm*—Knobbe, Martens, Olson & Bear LLP

[57] ABSTRACT

A magnetic tape cartridge library includes a memory which stores calibration parameters associated with the tape cartridges and the tape drives. The tape cartridges preferably have a cartridge identifier written to the tape in a plurality of locations along the tape. When a tape cartridge is inserted into a tape drive, the appropriate calibration parameters are retrieved in order to bypass a tape drive initialization sequence.

9 Claims, 5 Drawing Sheets

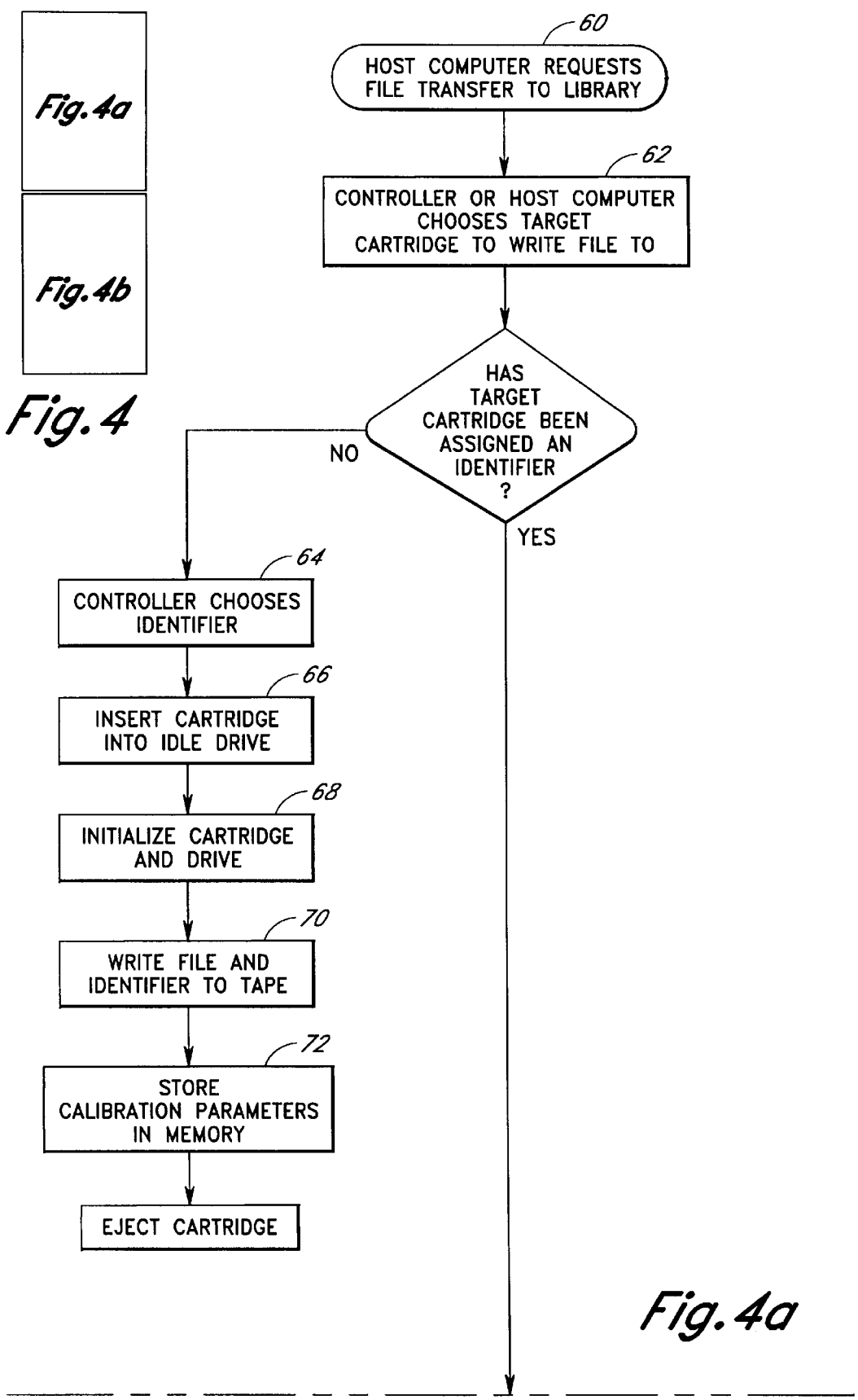

AUTOMATED TAPE CARTRIDGE LIBRARY WITH ACCELERATED CALIBRATION

BACKGROUND OF THE INVENTION

The present invention relates to data processing systems, and more specifically, to automated data storage and retrieval systems which comprise a library of magnetic tape cartridges as well as one or more tape drives for reading from and writing to the tapes in the library.

Magnetic tape cartridges, magnetic disks, and optical disks are all widely used as peripheral memory storage devices for computer systems. Large computer systems often operate in conjunction with external libraries having dozens of such media elements as well as the media element readers used to retrieve and record data. Although originally such media elements were selected and loaded manually, automated libraries were developed to expedite the handling of the media. These systems include means for accessing a desired media element, retrieving it from its storage position, and loading it into an appropriate reader.

As data storage requirements for computer systems have increased from megabytes to gigabytes to terabytes, the development of automated media libraries has received considerable attention. Some embodiments of such libraries comprise a small number of magnetic tape cartridges, six or ten being typical, and one or two tape drives housed in a single enclosure. Cabinet and even room sized systems have also been developed which hold a much larger number of tapes and drives, and which further comprise robotic arms, usually translatable on all three axes, which remove tapes from storage and place them in tape drives. Furthermore, due to the increasing use of wide-area-networks, interconnected tape library systems forming a single dispersed database have become more common.

In such large scale multi-element and even multi-library data storage systems, system speed has become limited mostly by the mechanics of media transfer from storage locations to drive locations and subsequent drive actuation rather than by the speed of data transfer between the host computer and the library system controller. Library systems having magnetic tape cartridges as media elements rather than magnetic or optical disks have an additional drawback in this regard because magnetic tape cartridges are generally rewound with each insertion into a tape drive, and this rewind operation delays file extraction.

The rewind operation is traditionally performed whenever a new tape cartridge is inserted into a tape drive. For some tape cartridge formats, rewinding is required by the nature of the media. Tape cartridges in the DLT format developed by Digital Equipment or the 3480 format developed by IBM, for example, contain only one reel, and therefore cartridge extraction from the tape drive requires the rewinding of the tape back onto the cartridge reel.

Some tape cartridges, however, may be removed at any point along the tape. For these cartridges, tape insertion is generally followed by an initialization process which includes a rewind operation to the logical beginning of tape (BOT). This point is generally at the physical BOT as well, but it may be provided at any location along the tape. During this initialization process, information may be read from the tape, and read/write calibration parameters for the tape drive heads may be optimized for the particular tracks on the tape which has been installed. The same initialization process is also typically performed at drive power up.

Because tape drives have most often been used as stand alone back up devices in environments where the operation generally involves the sequential reading/writing of the active tape, this initialization process has not significantly slowed drive operation. When utilized in a tape library, however, where random access to data is the norm, frequent rewinding and tape initialization can significantly slow system speed. What is needed, therefore, is a tape library with integrated tape cartridges, tape drives, and system controller, such that all of the tapes in the library may be recognized by the drives in the library, thereby rendering the initialization process unnecessary.

SUMMARY OF THE INVENTION

The present invention provides an improved data storage and retrieval system incorporating magnetic tape cartridges. The system of the present invention increases data access rates by providing for data access without tape drive initialization following the insertion of a tape cartridge into a tape drive.

The data storage and retrieval systems according to the present invention may include a tape drive or controller having a microprocessor and a memory, wherein the memory stores calibration parameters relating to a plurality of tape cartridges. Preferably, the calibration parameters are stored in the memory in association with a plurality of tape cartridge identifiers such that the appropriate calibration parameters may be either retrieved by the tape drive from its internal memory, or communicated to the tape drive from the controller memory when a particular tape cartridge is inserted into that tape drive. This storage and retrieval of calibration parameters allows a tape cartridge library system to bypass the tape drive initialization procedure generally utilized to obtain and generate these parameters upon tape cartridge insertion.

Preferably, a data storage and retrieval system according to the present invention comprises a host computer system, a plurality of tape cartridges, at least one tape drive, and a controller which interfaces with both the host computer system and the tape drive(s). The controller initiates read and write sequences by the tape drive according to commands from the host computer system. In a preferred embodiment, at least one tape cartridge is identified with an identifier written to a plurality of locations on the magnetic tape in the tape cartridge, and the identifier is communicated to the controller after the tape cartridge is inserted into the tape drive. The identifier may be written adjacent to each data block on the magnetic tape. Preferably, the identifier is generated by the controller utilizing a number generating process having a non-deterministic component.

In one embodiment, the controller compares the identifier to a reference identifier stored in the memory, and only initiates a read or a write sequence when the identifier is identical to the reference identifier. This feature ensures that the correct tape is being written to or read from.

Furthermore, a method of accessing data stored on a tape cartridge is provided by the present invention which comprises the steps of inserting a tape cartridge into a tape drive, sending a request for a block of data from a controller to the tape drive, and communicating the data block from the tape drive to the controller without initializing the tape drive after the inserting step. Further system speed improvements may be provided by storing in a memory in either the tape drive or the controller a numerical value indicative of the position of the magnetic tape inside a tape cartridge when it is ejected from a tape drive, and which may also store read and write calibration parameters associated with a particular tape drive and cartridge. This facilitates the immediate tape movement to a requested data block without tape rewinding and drive initialization.

BRIEF DESCRIPTION OF THE DRAWINGS

FIGS. 4, 4a, and 4b form a flow chart illustrating the sequence of steps performed by a preferred embodiment of the present invention when transferring a file from the host to the library.

DETAILED DESCRIPTION OF THE PREFERRED EMBODIMENT

Figure 1:
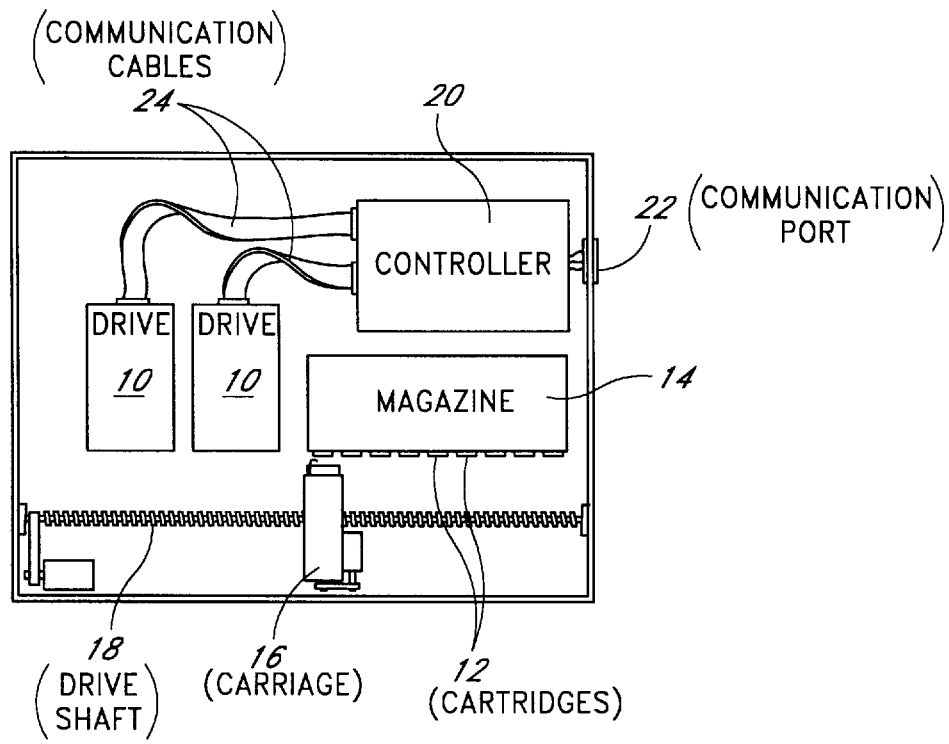
FIG. 1 is a top plan view of one embodiment of a data storage and retrieval system according to the present invention.

A top view of a tape cartridge library suitable for use with the present invention is illustrated in FIG. 1. A preferred library comprises a plurality of tape drives 10, and a plurality of tape cartridges 12 which are preferably stored in a rack or magazine 14. The drives 10 are adapted to read the particular format of tape cartridge 12 provided in the library. In accordance with the present invention, the tape cartridges 12 are of a format which can be inserted into and extracted from the drives 10 with any portion of the magnetic tape in the cartridge in operative alignment with the read and write heads within the drive 10. Some specific examples of such tape cartridges are the 8 mm tape cartridge, as well as the Travan and QIC formats.

Further provided in the tape cartridge library of FIG. 1 is a carriage 16 which operates to remove appropriate tape cartridges from the rack 14, and install them into one of the drives 10 for subsequent data retrieval. In the embodiment illustrated in FIG. 1, the carriage 16 moves back and forth along a drive shaft 18 to transfer tape cartridges from the rack 14 to the drives 10.

The tape cartridge library also comprises a library controller 20, which interfaces to a host computer system through an communication port 22, which is preferably of SCSI format, although other communication protocols are suitable and are well known to those in the art. The controller 20 comprises circuitry which controls the action of the carriage 16 in response to commands from the host computer system through the SCSI communication port 22. The library controller also interfaces with the tape drives 10 through communication cables 24, which are also preferably SCSI format.

It is important to note that the applicability of the present invention is not limited to the particular system described with regard to FIG. 1. Many different embodiments of tape cartridge libraries are well known in the art. Some have a single tape drive and a relatively small number of tape cartridges. Other libraries are cabinet or even room sized and contain five, six, or more tape drives and dozens of tape cartridges. Cartridge transfer mechanisms also vary widely. Some systems move the tape drive to the cartridges. Others provide articulated robotic arms which grasp and carry tape cartridges and insert them into tape drives. Still others are modular in nature, and provide mechanisms for swapping tape cartridges between modules. In these systems, the controller 20 may be external to all of the modules, or its functions may be split between electronics within the modules and electronics external to the modules. The performance of all of these different types of tape cartridge libraries may be improved using the principles of the present invention.

In prior art systems, the library tape drives are designed for use as stand alone data storage devices. Accordingly, a tape drive initialization process is routinely performed each time a new tape is inserted into the drive. Therefore, before a tape drive in a prior art system can execute a command to retrieve a data block and communicate it to the library controller, a significant amount of time is spent in rewinding the magnetic tape in the cartridge until the logical beginning of tape is operatively aligned with the read/write heads of the tape drive. Some of the parameters typically adjusted and optimized during this calibration process are write current, read gain, tension, and track offset.

In a tape cartridge library, however, it is not necessary for a tape drive to effectively presume that an inserted tape cartridge is completely new to the tape drive. It is therefore possible to eliminate the initialization procedure described above in many instances of tape cartridge insertion.

Figure 2:
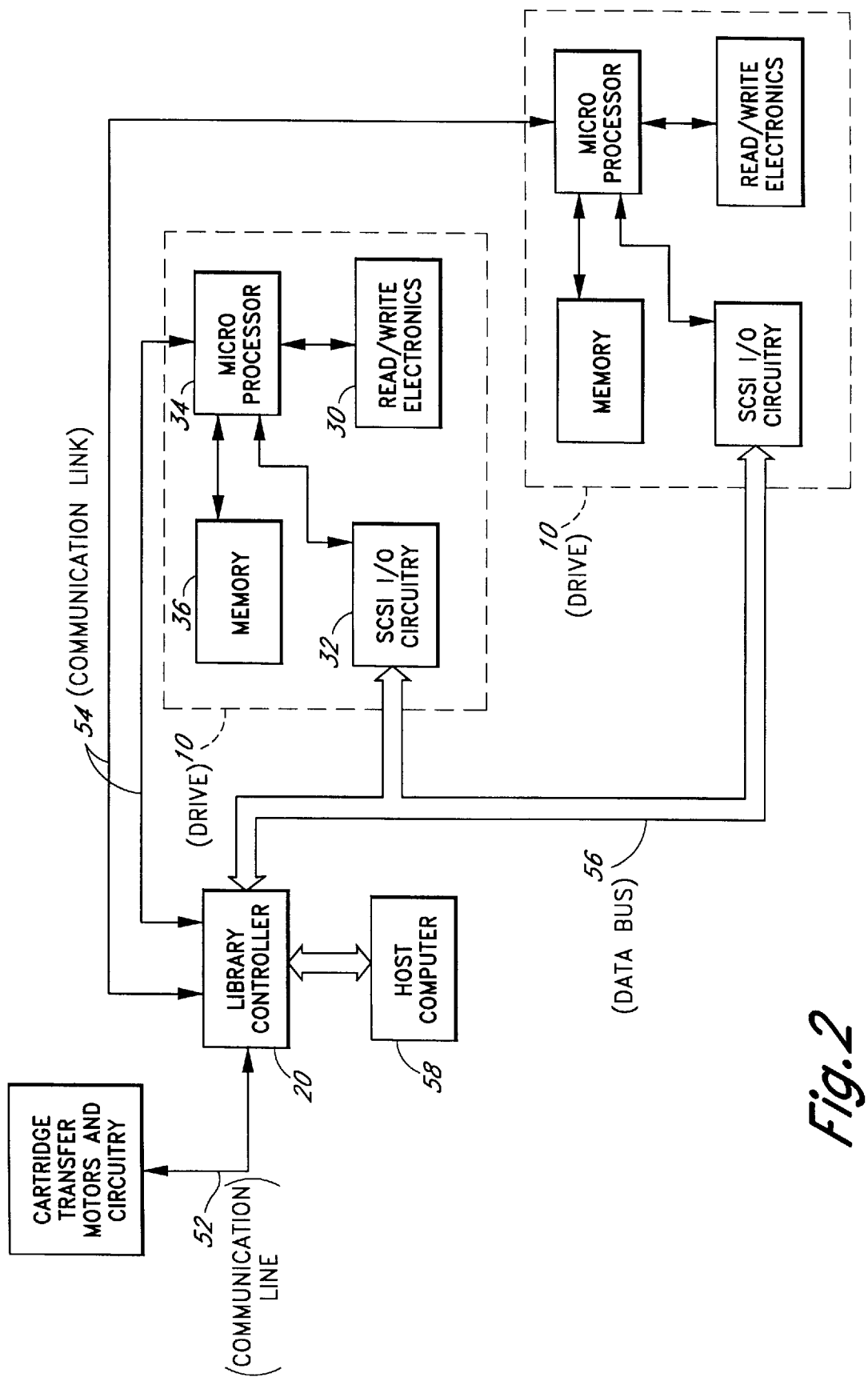
FIG. 2 is a block diagram of a data storage and retrieval system according to the present invention, illustrating the communication between the system controller and the tape drives.

Referring now to FIG. 2, it can be seen that a tape drive 10 according to the present invention comprises read/write electronics 30, SCSI I/O circuitry 32, a microprocessor 34, and a memory 36. As described above with respect to prior art tape drives, tape drive initialization results in the storage of several calibration parameters in the tape drive memory 36. Furthermore, the calibration parameters will depend on both the particular tape being initialized as well as the particular drive it is being initialized in.

Tape drives adapted for use as stand alone data storage devices recalculate and replace these parameters each time a tape cartridge is inserted into the tape drive. In a tape drive according to the present invention which is adapted for use in a tape cartridge library, however, these parameters remain stored in a location in the memory 36 for later retrieval when the same tape cartridge is inserted into that drive 10. The memory 36 of the tape drive therefore stores several sets of calibration parameters, wherein each set is associated with a particular tape cartridge of the library. Therefore, when a particular tape cartridge is inserted into a tape drive, the tape drive simply accesses the previously stored parameters for that tape cartridge and bypasses the initialization process normally utilized to generate them.

Further system speed improvements may be provided by also storing in memory a numerical value indicative of the position of the magnetic tape (i.e. tape position state) inside a tape cartridge when it is ejected from a tape drive. Although tape position can be determined from existing data block identifiers written to the tape, this avoids any initial "hitching around", and therefore facilitates the immediate tape movement toward a requested data block without searching for location information first.

In an alternative embodiment, a memory in the controller may store the calibration parameters. In this case, the tape drive will preferably communicate the relevant parameters to the controller through the SCSI interface when a tape is first inserted into the tape drive and the parameters are initially calculated. When that tape is reinserted into the tape drive at a future time, the controller will communicate the appropriate parameters back to the tape drive, again over the existing SCSI interface.

Standard tape drives in existence today are not provided with memory locations for the long term storage of many sets of calibration parameters, nor do they communicate them externally when they are calculated. However, modifications to tape drive circuitry in order to perform these functions may be designed and built by those of skill in the art without undue experimentation.

Figure 3:
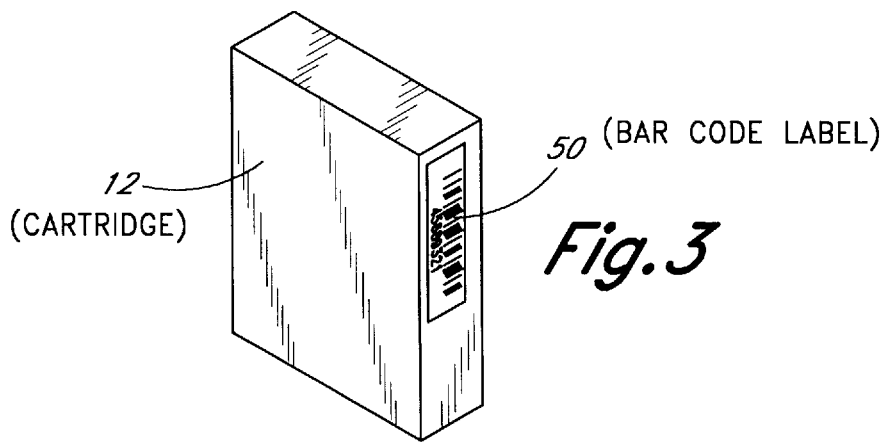
FIG. 3 is a perspective view of a tape cartridge incorporating a bar code identifier.

It can be appreciated that the tape drive must be capable of identifying the tape cartridge that has been inserted in order to retrieve the correct set of calibration parameters from the memory. This identification can be performed in several ways. In one embodiment of the present invention, each tape cartridge is labeled with a bar code label 50 on one end, as is illustrated in FIG. 3. The bar code can be read by a bar code reader affixed to the transfer carriage 16 or to whatever cartridge transfer and manipulation apparatus is provided by the library. Referring again to FIG. 2, the output of the bar code reader may be routed to the library controller via the communication line 52 between the library controller and the cartridge transfer and manipulation circuitry. From the library controller 20, the information may be communicated to the tape drive microprocessor 34 either over a second communication link 54 between the controller 20 and the tape drive 10, or over the SCSI data bus 56 which is also present.

Alternatively, the cartridge identifier can be written to commercially available magnetic chip which is permanently attached to the tape cartridge. This is essentially equivalent to the bar code label encoded identifier discussed above, but has the advantage that the identifier encoded on the magnetic chip can be changed without having to print and affix a new label to the cartridge as is necessary if bar code labels are used.

In a preferred embodiment of a tape cartridge library according to the present invention, the tape cartridge identifier is written to a plurality of locations on the magnetic tape in the cartridge itself. This identification scheme has the advantages of the magnetic chip discussed above, but requires no external detection circuitry as is required by the bar code label or the magnetic chip. In this embodiment, the tape drive reads the identifier off of the tape, and accesses the appropriate calibration parameters for that tape such that data retrieval can be performed immediately without first initializing the tape drive.

System speed is of course maximized if the tape drive 10 can locate and read the identifier without searching a large length of tape. Therefore, it is preferable to write the identifier to the tape at short physical intervals along the length of the tape. The identifier may be associated with every data block, but acceptable performance is obtainable if the identifier is written to the tape once for every five or ten data blocks.

The tape identifier performs an additional important function. The identity of a tape cartridge 12 removed from a storage location in a rack 14 and inserted into a drive 10 can be checked by the library controller 20 prior to performing any read or write operation on the tape. Preferably, if the library controller 20 receives an unexpected identifier either from the bar code or magnetic chip reader discussed above, or from the tape drive if the identifier is written to the tape, it sends an error message to the host computer 58.

In order for this checking function to be effective and reliable, it is preferable for the identifier to be unique. This may be accomplished in several ways. In one embodiment, bar code identifier labels are be uniquely generated for each tape cartridge of the library system. When the identifier is written to the tape, the identifier is preferably generated by the controller with a number generating process with a non-deterministic component which provides a sufficiently low likelihood of duplication.

Figure 4B:
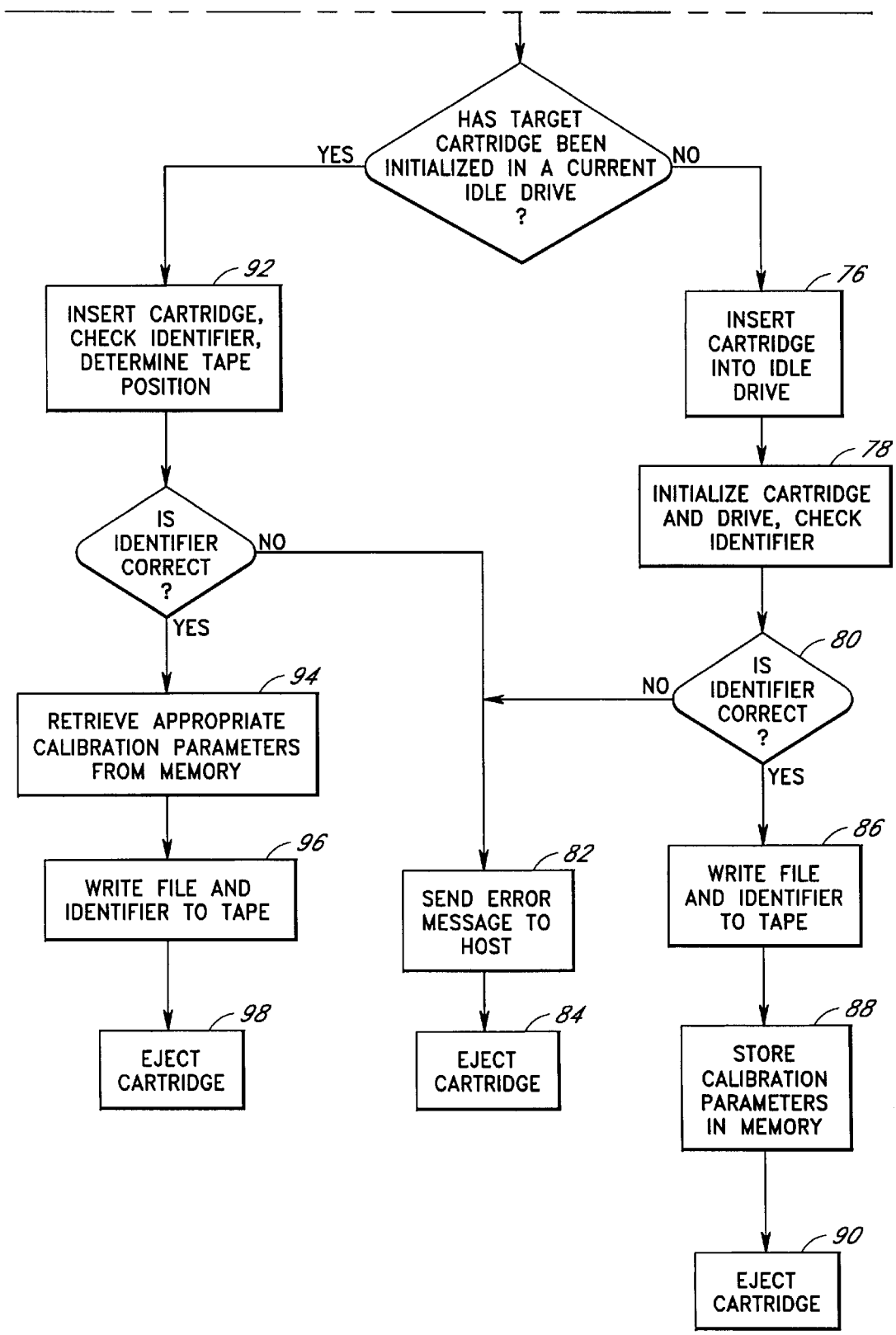

The operation of a preferred embodiment of the system may now be described with reference to FIGS. 4 and 5. FIG. 4 is a flow chart illustrating a set of steps which results in a file transfer from the host computer system to the library. First, at step 60, the host computer requests a file transfer from the host to the library. The controller then chooses a target tape cartridge to write the file to at step 62. Alternatively, the host computer could communicate to the controller which cartridge to utilize. The controller may choose to overwrite an existing file, or create a new one depending on the file being transferred. If the target cartridge is blank, it may not have been assigned an identifier. If it has not, the controller generates a preferably unique, random, or pseudo-random identifier for the target cartridge. This identifier may be generated in many ways well known to those in the art, such as utilizing an incremented counter, or generating the identifier with a process that is at least partially non-deterministic. It is one aspect of a preferred system according to the present invention that identifier assignments and verification are performed by the controller in operations which are transparent to the user of the host computer system unless an error is detected as explained in more detail below.

The cartridge is then inserted into an idle library tape drive at step 66. If the target cartridge does not already have an identifier, this indicates that it has never been utilized in the library before because identifier assignment is preferably performed when the first file is written to a tape cartridge. In this case, no calibration parameters have been stored for this tape in any library drive. The tape drive must therefore be initialized with the target tape cartridge installed at step 68. Following initialization, the file and identifier are written to the tape at step 70, with the identifier associated with at least some of the data blocks comprising the stored file as discussed above. The calibration parameters determined from the initialization are then stored in the tape drive memory 36 at step 72 for future retrieval when that tape is again inserted into that tape drive.

If the target cartridge has already been assigned an identifier in a prior write operation, the controller determines whether or not the target cartridge has been initialized before in a tape drive which is currently idle. If the target cartridge has not been initialized before in any currently idle drive, the system chooses an idle library drive and inserts the cartridge at step 76. Following this at step 78 the tape drive is initialized with the target cartridge inserted and the cartridge identifier is checked.

If the identifier cannot be verified as correct, at step 80 when the retrieved identifier is compared to the identifier expected by the controller, an error message is sent to the host at step 82 and the cartridge is ejected at step 84. However, if the identifier is verified as correct when compared to the expected identifier at step 80, the file from the host and the existing identifier are written to the tape at step 86. The calibration parameters are then stored in the tape drive memory 36 at step 88 for future use. The cartridge is then ejected at step 90.

The procedure above includes an initialization step, and is therefore similar to the operation of prior art tape cartridge libraries which initialize their tape drives with every tape cartridge installation. It may be noted, however, that this tape cartridge need not be initialized again in this tape drive. In the future, the calibration data obtained during this first initialization can be retrieved by the tape drive and the initialization procedure can be bypassed.

This is illustrated by the situation when there is a currently idle tape drive which has already been initialized with the target tape drive installed. In this case, the tape cartridge is inserted into that tape drive, and the tape position and cartridge identifier are immediately checked at step 92 by scrolling the tape a short distance and reading the nearest identifier code and data block number. The tape is not rewound, however, and the drive is not initialized.

If the identifier cannot be verified as correct, the system executes the error message communication and ejection steps 82, 84, previously described. If the identifier is verified as being correct, the tape drive microprocessor 34 retrieves the calibration parameters previously stored for that tape cartridge in that tape drive from the memory 36 at step 94. The file and existing identifier are then written to the tape at step 96, with the identifier being associated with at least some of the written data blocks, and the cartridge is then ejected at step 98.

Figure 5:
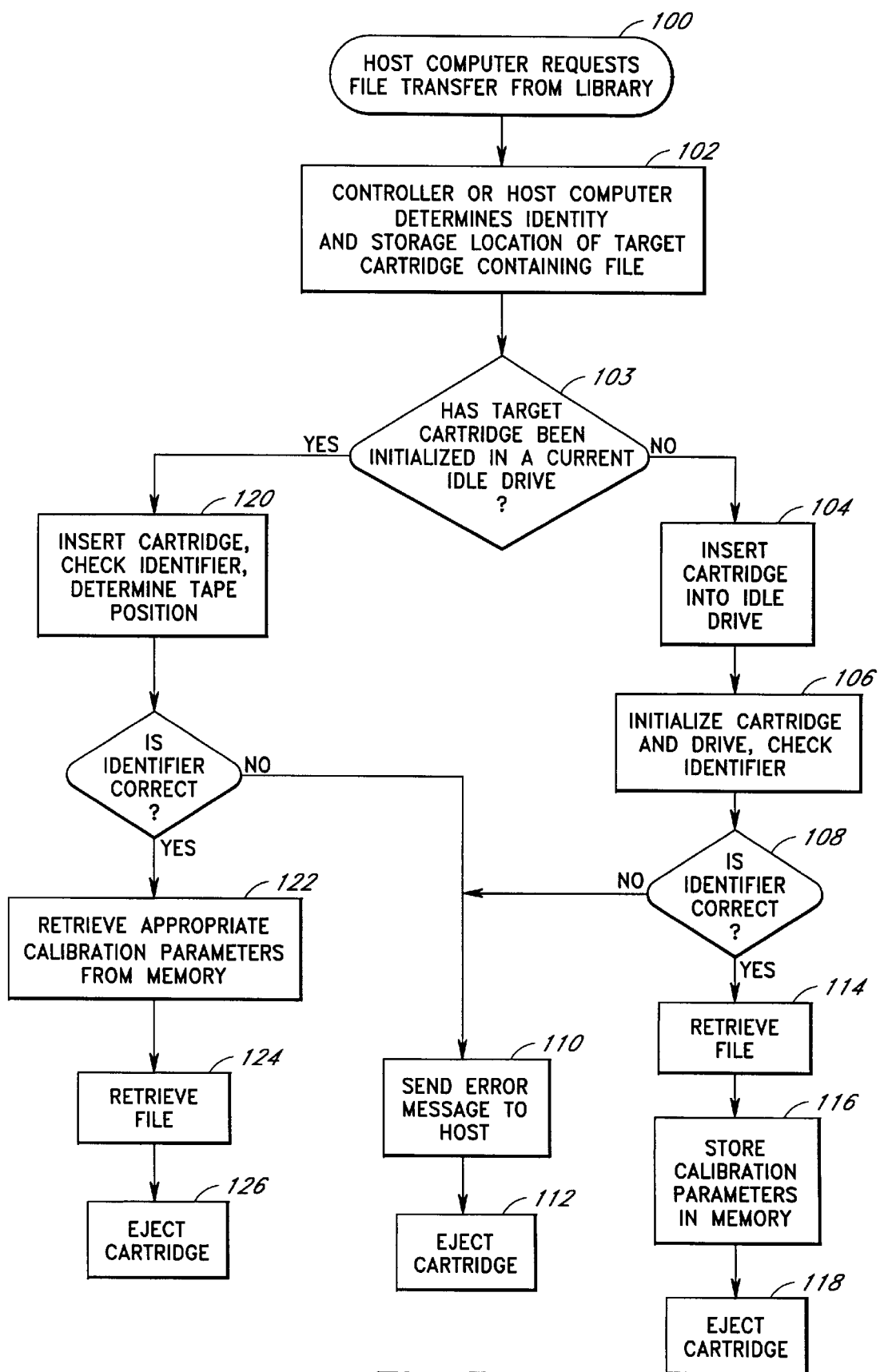
FIG. 5 is a flow chart illustrating the sequence of steps performed by a preferred embodiment of the present invention when transferring a file from the library to the host.

The procedure is similar when the host computer requests a file transfer from the library as can be seen with reference to FIG. 5. After the file request at step 100, the controller determines the identity and storage location of the tape cartridge which contains the requested file at step 102. Rather than having the controller store information concerning the physical location of stored data, the host computer may alternatively communicate to the controller the specific cartridge and data blocks to be retrieved.

Because this cartridge has a file written to it, it must already contain an identifier also written to the tape which is associated with at least some of the data blocks comprising the file.

As above, the controller then determines whether or not the target cartridge has been initialized before in a tape drive which is currently idle at step 103. If the target cartridge has not been initialized before in any currently idle drive, the system chooses an idle library drive and inserts the cartridge at step 104. Following this at step 106 the tape drive is initialized with the target cartridge inserted and the cartridge identifier is checked. If the identifier cannot be verified as correct when compared to the identifier expected by the controller at step 108, an error message is sent to the host at step 110 and the cartridge is ejected at step 112. However, if the identifier is verified as correct when compared to the expected identifier at step 108, the file is retrieved at step 114. The calibration parameters are then stored in memory 36 at step 116 for future use when that tape cartridge is again inserted into that tape drive. The cartridge is then ejected at step 118.

As above with file transfers from the host to the library, when there is a currently idle tape drive which has already been initialized with the target tape cartridge installed, the tape cartridge is inserted, and the tape position and cartridge identifier are immediately checked at step 120 by scrolling the tape a short distance and reading the nearest identifier code and data block number. The tape is not rewound, however, and the drive is not initialized.

If the identifier cannot be verified as correct, the system executes the error message communication and ejection steps 110, 112, as described above. If the identifier is verified as being correct, the tape drive microprocessor 34 retrieves the calibration parameters previously stored for that tape cartridge in that tape drive from the memory 36 at step 122. The file is then retrieved at step 124, and the cartridge is ejected at step 126.

It can be appreciated that with continued use, each tape drive will be initialized with more of the library tape cartridges installed. Over time, therefore, initialization procedures will become less and less frequent, and system speed is thereby improved. It may also be noted that the memory 36 which stores the calibration parameters need not be physically located in the tape drive, but may comprise a portion of the library controller circuit instead. An important aspect of the present invention is that information concerning calibration parameters are stored in the system for retrieval when needed to bypass what would otherwise be a redundant initialization process.

The foregoing description details certain preferred embodiments of the present invention and describes the best mode contemplated. It will be appreciated, however, that no matter how detailed the foregoing appears in text, the invention can be practiced in many ways. For example, the data storage media used need not be tape cartridges, but could be any type of media element requiring a time consuming identification or calibration process prior to data retrieval. The invention should therefore be construed in accordance with the appended claims and any equivalents thereof.

What is claimed is:

1. A data storage and retrieval system comprising:
   a host computer system;
   at least one media element;
   at least one media element read/write device;
   a controller which interfaces with both said host computer system and said at least one media element read/write device and which initiates read and write sequences by said at least one media element read/write device according to commands form said host computer system; and
   a memory, wherein said memory stores a plurality of calibration parameters, where each calibration parameter is associated with a particular media element and a particular media element read/write device, wherein the calibration parameters stored in the memory are utilized to bypass a media element read/write device initialization sequence.

2. The data storage and retrieval system of claim 1 where said at least one media element comprises a tape cartridge housing magnetic tape, where said at least one media element read/write device comprises a tape drive.

3. The data storage and retrieval system of claim 2 wherein said memory is located in said tape drive.

4. The data storage and retrieval system of claim 2 wherein said memory is external to said tape drive and wherein said controller communicates said calibration parameters to said tape drive when said tape cartridge is inserted into said tape drive.

5. The data storage and retrieval system of claim 2 wherein a cartridge identifier is written to a plurality of locations on magnetic tape in said tape cartridge which identifies said tape cartridge.

6. The data storage and retrieval system of claim 2 wherein said memory also stores information concerning the tape position state of the magnetic tape in said tape cartridge.

7. In a data storage and retrieval system comprising a control unit, at least one tape drive, and a plurality of tape cartridges, a method of accessing data stored on one of said plurality of tape cartridges comprising the steps of:
   inserting one of said tape cartridges into said at least one tape drive;
   retrieving calibration parameters associated with said inserted tape cartridge and said at least one tape drive from a memory to bypass a tape drive initialization sequence;
   sending a request for a block of data from said controller to said at least one tape drive; and, communicating said data block from said at least one tape drive to said controller.

8. A tape drive having a microprocessor and a memory, wherein said memory stores a plurality of calibration parameters relating to a plurality of tape cartridges and the tape drive wherein the calibration parameters stored in the memory are utilized to bypass a media element read/write device initialization sequence.

9. The tape drive of claim 8 wherein said calibration parameters are stored in said memory in association with a plurality of tape cartridge identifiers such that calibration parameters associated with a first identifier may be retrieved by said tape drive in response to the insertion of a tape cartridge bearing said first identifier.

* * * * *